United States Patent
Numakura

(10) Patent No.: US 9,967,432 B2
(45) Date of Patent: May 8, 2018

(54) AUTHENTICATION SYSTEM AND MOBILE TERMINAL FOR EXECUTING USER AUTHENTICATION WITH ULTRASONIC COMMUNICATION FUNCTION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yoshikatsu Numakura, Ito Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/256,983

(22) Filed: Sep. 6, 2016

(65) Prior Publication Data
US 2018/0069987 A1    Mar. 8, 2018

(51) Int. Cl.
*H04N 1/44* (2006.01)
*H04N 1/00* (2006.01)
*H04N 1/32* (2006.01)

(52) U.S. Cl.
CPC ....... *H04N 1/4426* (2013.01); *H04N 1/00204* (2013.01); *H04N 1/00307* (2013.01); *H04N 1/32117* (2013.01); *H04N 1/444* (2013.01); *H04N 2201/0094* (2013.01)

(58) Field of Classification Search
None
See application file for complete search history.

(56) References Cited

U.S. PATENT DOCUMENTS

| 2007/0064947 | A1* | 3/2007 | King | H04L 9/32 380/270 |
| 2010/0210303 | A1* | 8/2010 | Takizuka | G06F 3/14 455/557 |
| 2011/0070925 | A1* | 3/2011 | Han | H04M 19/04 455/567 |
| 2014/0247468 | A1* | 9/2014 | Hagiwara | A47B 47/02 358/1.15 |
| 2015/0234624 | A1* | 8/2015 | Nii | G06F 3/1238 358/1.14 |
| 2016/0077778 | A1* | 3/2016 | Aritomi | G06F 21/35 358/1.15 |
| 2016/0221363 | A1* | 8/2016 | Bae | B41J 11/0005 |

* cited by examiner

*Primary Examiner* — Mohammad Ghayour
*Assistant Examiner* — Pawandeep Dhingra
(74) *Attorney, Agent, or Firm* — Amin, Turocy & Watson LLP

(57) ABSTRACT

An authentication system comprises a mobile terminal configured to output an ultrasonic wave including authentication information; and a first device configured to receive the ultrasonic wave output by the mobile terminal, carry out authentication on the basis of the obtained authentication information extracted from the ultrasonic wave and allow execution of a job at the time the authentication is established.

13 Claims, 8 Drawing Sheets

FIG.6

| ITEM | WAVEFORM |
|---|---|
| COPY | (sine wave) |
| SCAN | (triangle wave) |
| FAX SENDING | (square wave) |
| NUMBER OF COPIES | (sine wave) |
| MAGNIFICATION | (sine wave) |
| AGGREGATE NUMBER OF SHEETS | (sine wave) |
| ⋮ | ⋮ |
| A | (triangle wave) |
| B | (triangle wave) |
| C | (triangle wave) |
| ⋮ | ⋮ |
| Z | (triangle wave) |
| 0 | (mixed wave) |
| ⋮ | ⋮ |
| 9 | (mixed wave) |

601: COPY, SCAN, FAX SENDING
602: NUMBER OF COPIES, MAGNIFICATION, AGGREGATE NUMBER OF SHEETS, ⋮
603: A, B, C, ⋮, Z, 0, ⋮, 9

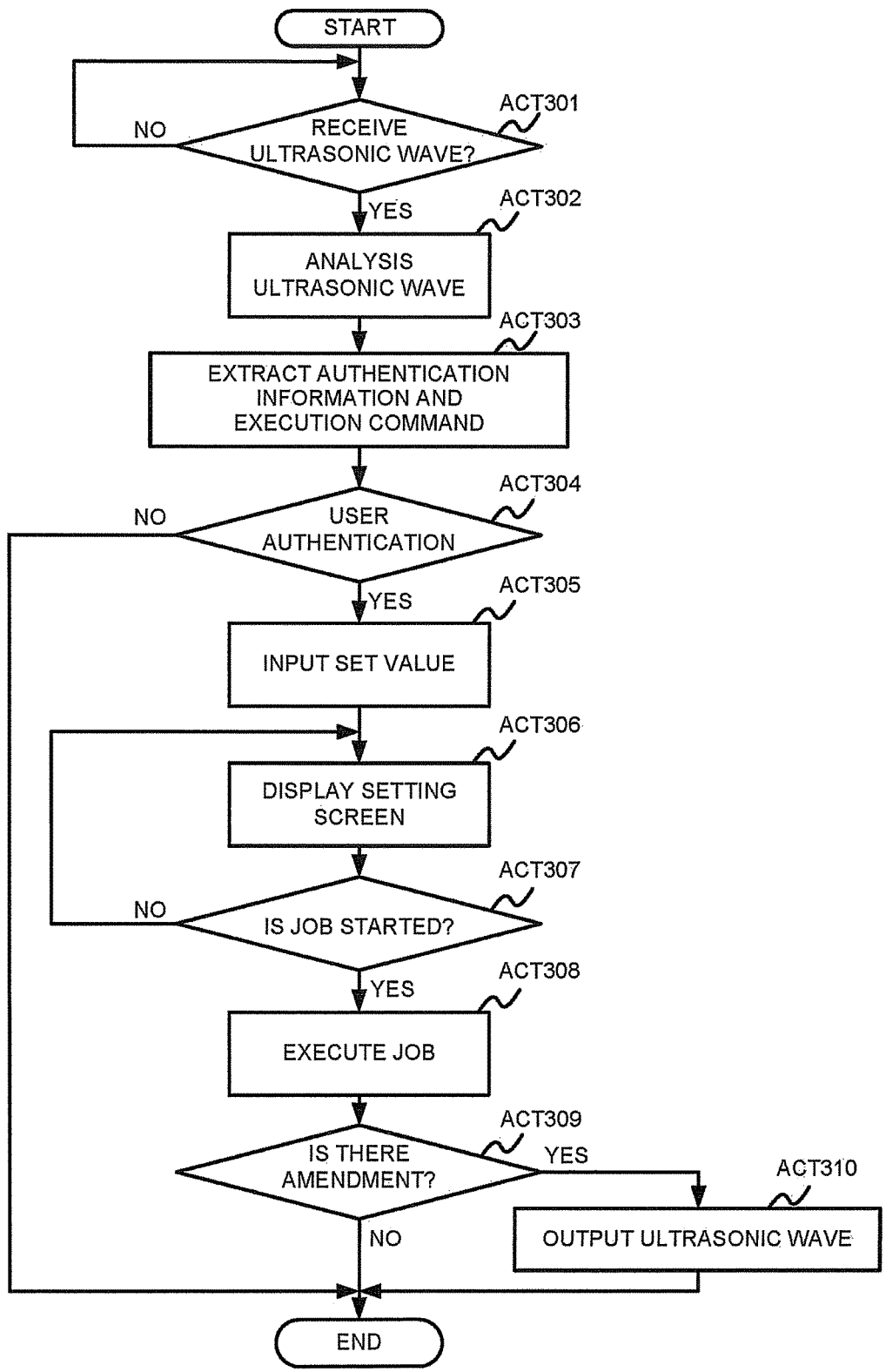

AUTHENTICATION SYSTEM AND MOBILE TERMINAL FOR EXECUTING USER AUTHENTICATION WITH ULTRASONIC COMMUNICATION FUNCTION

FIELD

Embodiments described herein relate generally to an image forming apparatus using a speaker and a mike to carry out ultrasonic communication and a mobile terminal.

BACKGROUND

In a conventional image forming apparatus, user authentication is carried out through a security card (using RFID technology). In such an image forming apparatus, the user authentication is carried out by closing a security card owned by a user to an installed RFID tag reader/writer (RFID terminal).

However, in the authentication method, a card is held over the RFID terminal and an intended operation is executed after the authentication is completed, and thus undesirable amount time and labor are spent until the operation is executed.

DESCRIPTION OF THE DRAWINGS

FIG. 6 is diagram illustrating an example of waveforms of sound data corresponding to execution jobs and parameters;

FIG. 9 is a flowchart illustrating an example of operations of the image forming apparatus according to the embodiment.

DETAILED DESCRIPTION

Figure 1:
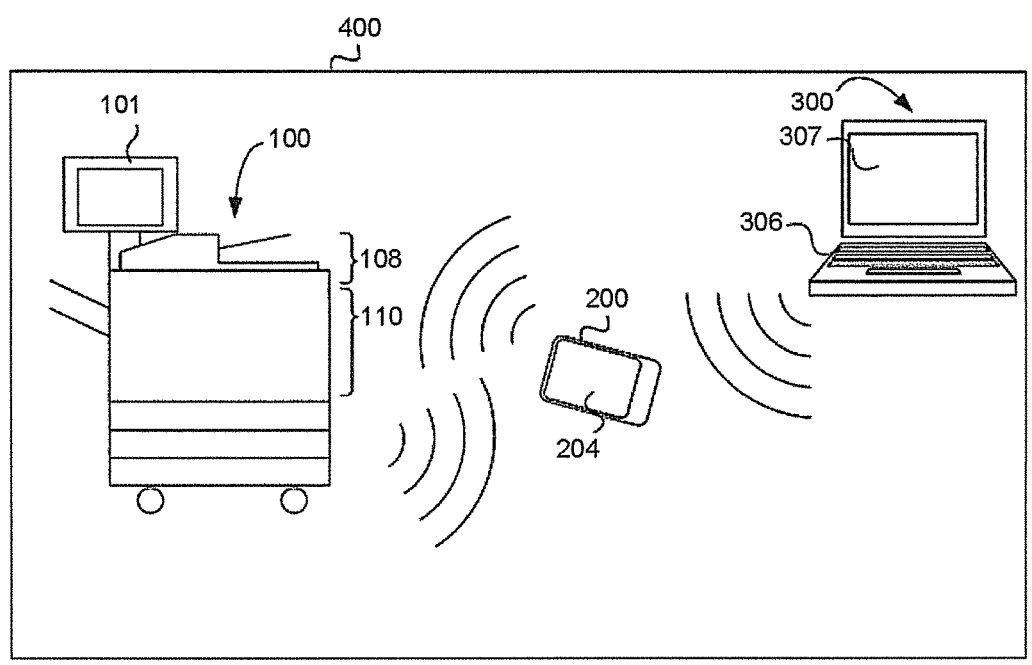
FIG. 1 is a schematic diagram illustrating a system including an image forming apparatus, a mobile terminal and a PC according to an embodiment.

In accordance with an embodiment, a system serving as an authentication system comprises a mobile terminal and a first device. The mobile terminal outputs an ultrasonic wave including authentication information. The first device receives the ultrasonic wave output by the mobile terminal, carries out authentication on the basis of the authentication information extracted from the ultrasonic wave and allows execution of a job at a time the authentication is established.

In accordance with another embodiment, a mobile terminal comprises a speaker, a storage section, a display section and a processor. The storage section stores ultrasonic data equal to or greater than 1 serving as electronic data obtained by encoding ultrasonic wave and serving as electronic data of an ultrasonic wave including authentication information for authenticating whether or not use of a first device is allowed. The display section displays inherent information for specifying each ultrasonic data on a screen. The processor controls to regenerate the ultrasonic data corresponding to selected inherent information to output the regenerated ultrasonic data by a speaker.

In accordance with yet another embodiment, a PC (Personal Computer) or similar device receives input of identification information of a user, authentication information of a password and information such as an execution job such as a copy job and a parameter of the execution job in order to use an image forming apparatus. The PC of the embodiment defines the input information as first information and creates or generates data for ultrasonic wave output including the first information. The created data is output from a speaker in the form of ultrasonic wave or sent by being added in an e-mail to a mobile terminal.

In accordance with still yet another embodiment, a mobile terminal receives ultrasonic data. Further, the mobile terminal accumulates ultrasonic data equal to or greater than 1 to store the ultrasonic data and can display data on a screen. Furthermore, the mobile terminal can output the selected data in the form of an ultrasonic wave from a speaker to an image forming apparatus. In this way, a user can proceed to a job by only selecting the data on the mobile terminal owned by the user.

In accordance with an embodiment, an image forming apparatus comprises a mike and a speaker. The mike receives an ultrasonic wave output by a mobile terminal. The speaker outputs an ultrasonic wave to the mobile terminal. The image forming apparatus of the embodiment extracts user authentication information from the received ultrasonic wave to carry out authentication. Further, it may be applicable that an external server carries out the authentication, and the image forming apparatus receives a determination result.

In accordance with another embodiment, an authentication method involves outputting an ultrasonic wave comprising authentication information; and receiving the outputted ultrasonic wave, carrying out authentication on the basis of the authentication information extracted from the ultrasonic wave and allowing execution of a job at a time the authentication is established.

Further, the image forming apparatus extracts an execution job and a parameter of the execution job from the received ultrasonic wave and sets the execution job as a job to be executed later and the parameter as a parameter at the time of execution of the job. Through such a configuration, as a user who owns the mobile terminal approaches the image forming apparatus, the image forming apparatus becomes a state in which authentication of the user is carried out and setting of the job and the parameter are completed, and thus an intended operation can be directly executed in a short time instead of executing a complex operation with the image forming apparatus.

Hereinafter, embodiments of the preset invention are described with reference to the accompanying drawings.

FIG. 1 is a diagram illustrating an example of the configuration of a system according to the present embodiment. The authentication system 400 includes an MFP 100 (Multifunction Peripheral) serving as an image forming apparatus (first device), a mobile terminal 200 and a PC 300 serving as a personal computer. The PC 300 sends ultrasonic data to the mobile terminal 200 by adding the ultrasonic data in an e-mail or outputs the ultrasonic data to the mobile terminal 200 in the form of the ultrasonic wave. The mobile terminal 200 receives data from the PC 300 and can carry out transmission and reception of data with the MFP 100 in the form of the ultrasonic wave.

The PC 300 includes a monitor 307 and an operation unit 306 such as a keyboard and a mouse. The PC 300 includes a processor which is a previous personal computer or a CPU (Central Processing Unit) and a storage section such as a memory and an HDD which stores data in a volatile or non-volatile manner.

The mobile terminal 200 includes a touch panel display 204 which displays reception data and receives an operation of a user.

The MFP 100 is a multifunction peripheral which includes at least a copy function, a printing function and/or a scanning function. The MFP 100 includes a scanner unit 108 which reads a document sheet and a printer unit 110 which forms an image on a sheet. The MFP 100 further includes a control panel 101 which comprises a touch panel for receiving the operation of the user and a liquid crystal screen for display.

Figure 2:
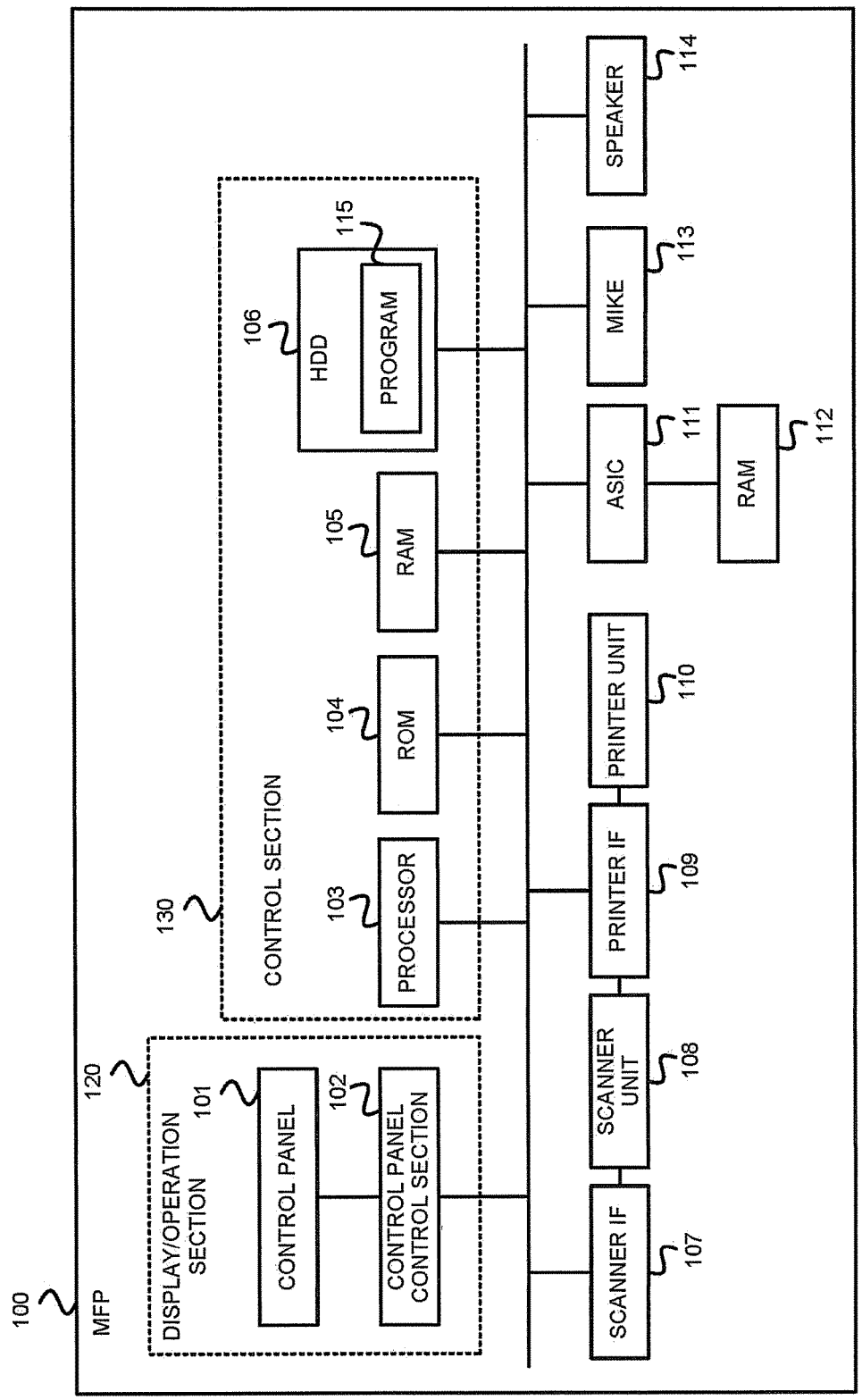
FIG. 2 is block diagram illustrating an example of the configuration of an MFP according to the embodiment.

FIG. 2 is a block diagram exemplifying the inside of the MFP 100.

The MFP 100 includes the foregoing scanner unit 108 and a scanner IF 107 (Interface) which controls communication between the scanner unit 108 and each hardware.

The MFP 100 includes the foregoing printer unit 110 and a printer IF 109 (Interface) which controls communication between the printer unit 110 and each hardware.

The MFP 100 includes a RAM 112 (Random Access Memory) for temporarily copying or decompressing a read image or, for example, image data for printing sent from the PC 300. The MFP 100 includes an ASIC 111 (Application Specific Integrated Circuit) which carries out various image processing on an image stored in the RAM 112.

The MFP 100 includes the foregoing control panel 101 and a control panel control section 102 which carries out display control of the control panel 101. The MFP 100 further includes a processor 103 serving as a CPU, a ROM 104 (Read Only Memory) which stores a system program in a non-volatile manner, a RAM 105 serving as a volatile main storage device and an HDD 106 (Hard Disk Drive) which stores data or the read image, information relating to the user and the set parameter in a non-volatile manner.

The MFP 100 includes a mike 113 which receives an ultrasonic wave output from the mobile terminal 200 and a speaker 114 which outputs an ultrasonic wave to the mobile terminal 200.

A program 115 is stored to the HDD 106 in advance. The processor 103 copies or decompresses the program 115 on the RAM 105 and executes the program 115 to realize mutual conversion of ultrasonic data and first information.

Further, in FIG. 2, the configuration including the control panel 101 and the control panel control section 102 is regarded as a display/operation section 120. The configuration including the processor 103, the ROM 104, the RAM 105 and the HDD 106 is regarded as a control section 130.

Figure 3:
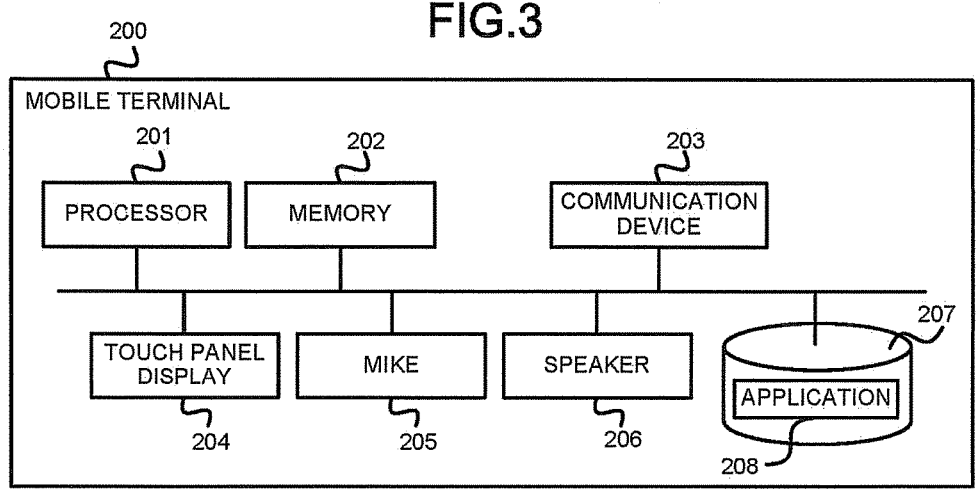
FIG. 3 is block diagram illustrating an example of the configuration of a mobile terminal according to the embodiment.

FIG. 3 is a block diagram exemplifying the inside of the mobile terminal 200.

The mobile terminal 200, which is, for example, a smart phone and a tablet, includes a processor 201 serving as a CPU, a memory 202 serving as a main storage device and an auxiliary storage device 207 such as an HDD or a flash memory.

The mobile terminal 200 includes a communication device 203 which controls data communication with an external device. Ultrasonic data sent from the PC 300 through an e-mail is received via the communication device 203.

The mobile terminal 200 includes a touch panel display 204 in which touch panels are arranged in a flat type liquid crystal screen in a laminated manner.

The mobile terminal 200 includes a mike 205 which inputs and receives the ultrasonic wave. The reception data is filed in a regulated format and recorded in the auxiliary storage device 207.

The mobile terminal 200 includes a speaker 206 which outputs the ultrasonic data designated by an application 208 to the MFP 100.

The application 208 is stored to the auxiliary storage device 207 in advance. The processor 201 copies or decompresses the application 208 in a memory 202 and carries out an arithmetic processing on the application 208 to realize ultrasonic communication between the MFP 100 and the PC 300.

Figure 4:
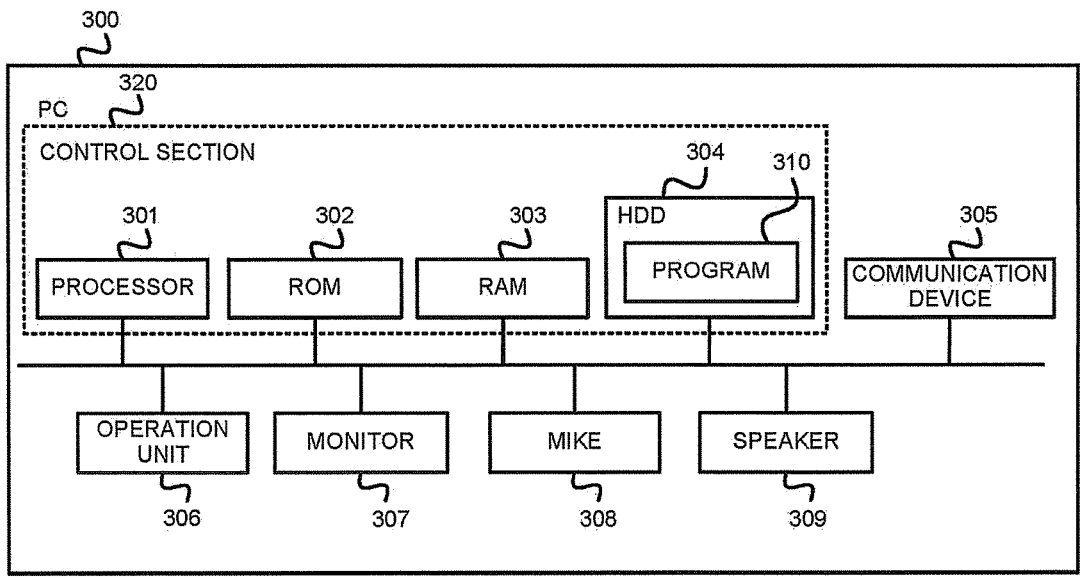
FIG. 4 is block diagram illustrating an example of the configuration of a PC according to the embodiment.

FIG. 4 is a block diagram exemplifying the inside of the PC 300.

The PC 300 includes a processor 301, a ROM 302, a RAM 303 and a HDD 304. Further, the configuration including the processor 301, the ROM 302, the RAM 303 and the HDD 304 is regarded as a control section 320.

The PC 300 includes a communication device 305 which controls data communication with an external device. The ultrasonic data added in the e-mail is sent to the mobile terminal 200 via the communication device 305.

The PC 300 includes an operation unit 306 such as a keyboard or a mouse for inputting necessary information and a monitor 307 which displays information.

The PC 300 includes a mike 308 which receives the ultrasonic wave sent from the mobile terminal 200.

The PC 300 includes a speaker 309 which outputs the ultrasonic wave to the mobile terminal 200.

A program 310 is stored to the HDD 304 in advance. The processor 301 copies or decompresses the program. 310 on the RAM 303 and executes the program 310 to realize mutual conversion between the ultrasonic data and the first information (authentication information, or a job and information of a parameter input by the user).

Further, the sending of the ultrasonic data from the PC 300 to the mobile terminal 200 is carried out by, for example, infrared communication, and may be carried out by another communication manner instead. In this case, the communication device 203 and the communication device 305 carry out another communication. Further, the communication means may be a wired manner or a wireless manner, and even the used protocol may be optional without limitations.

The foregoing ultrasonic data is generated or created with specific waveforms in response to various kinds of information included in the first information. In other words, the foregoing ultrasonic data is created by inserting the specific waveforms associated with the identification information of the user, the authentication information of the password and the information such as the execution job and the parameter input to the PC 300.

Figure 5:
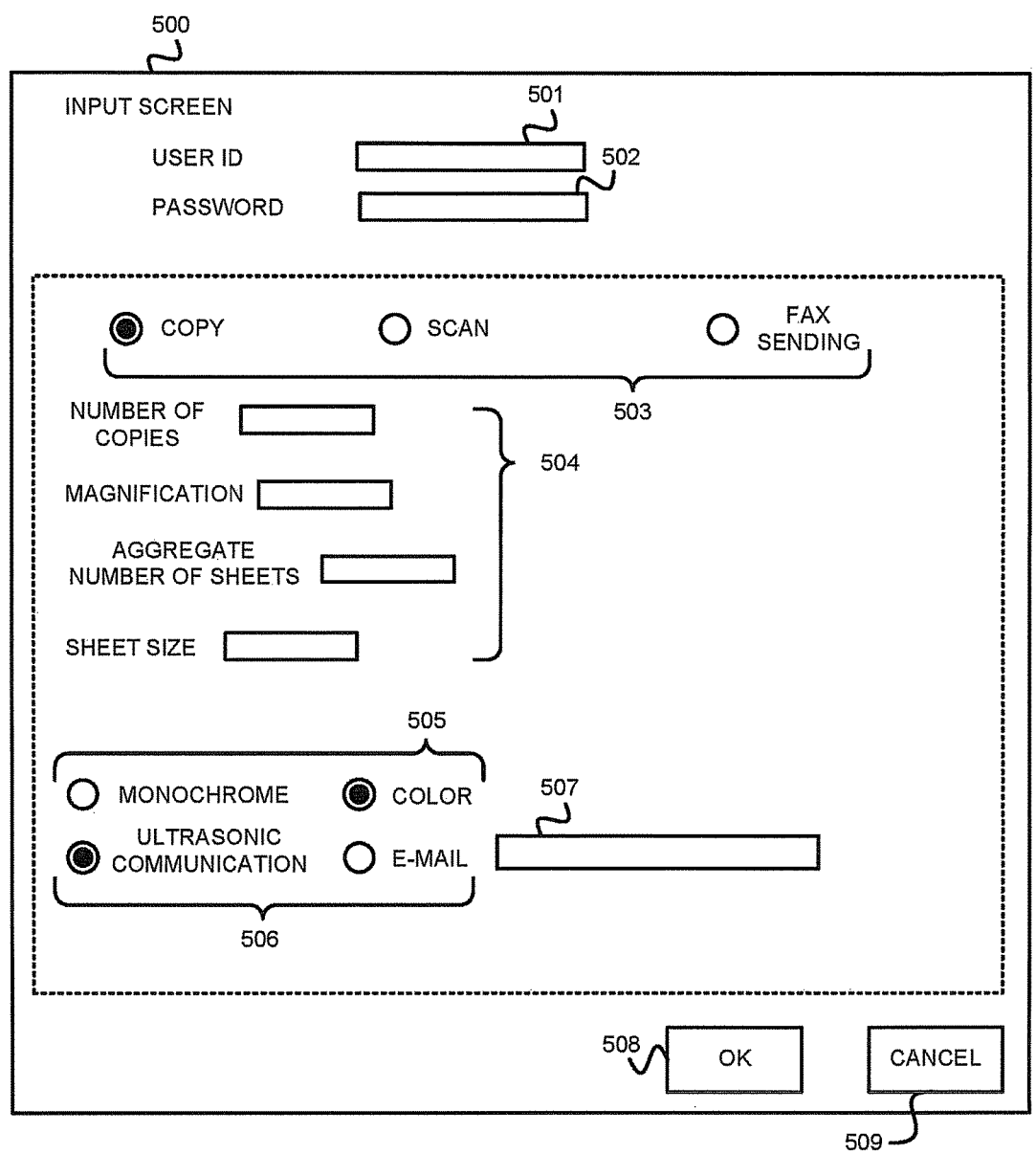
FIG. 5 is diagram illustrating an example of display of an input screen by the PC according to the embodiment.

FIG. 5 is a diagram illustrating an example of display of an input screen by the PC 300. The PC 300 displays the input screen exemplified in FIG. 5 on the monitor 307 and receives the input of the first information via the operation unit 306 in order to generate or create the ultrasonic data. Further, in FIG. 5, a parameter input column for copy job is displayed as an example; however, a parameter input column including resolution, a data size and the like in a case in which a scan job is selected and a parameter input column including a destination FAX number and the like in a case of a FAX sending job are displayed.

The input screen 500 includes a user ID input column 501 for authenticating the user of the MFP 100 and a password input column 502.

The input screen 500 includes, for example, a selection column 503 which designates a use method of the MFP 100 like copying, scanning and FAX sending.

The input screen 500 includes a parameter input column 504 in which parameters such as the number of copies, magnification, the aggregate number of sheets and a sheet size are set. Default values may be used as these parameters and set in each column.

The input screen 500 includes a selection column 505 for designating a printing color. The selection column 505 can only select one color.

The input screen 500 includes a selection column 506 for designating a communication method of the generated ultrasonic data. The input screen 500 includes an e-mail address input column 507 for inputting an e-mail forwarding address. In a case in which the e-mail is selected by the selection column 506, the PC 300 sends the ultrasonic data to the address in the input column 507.

Further, the input screen 500 may include a detail setting column for setting sheet designation or finish and a direction of printing in addition to input values 503~507. It is applicable that the detail setting may be set by being displayed on another input screen.

The input screen 500 includes a determination button 508 which sends a input value to the mobile terminal 200. Further, after the determination button 508 is pressed, a confirmation screen for confirming whether the sending of the input value is carried out or not may be displayed.

The input screen 500 includes a cancel button 509 for cancelling the sending of the input value. Further, after the cancel button 509 is pressed, a confirmation screen for confirming whether the input screen is ended or not may be displayed.

FIG. 6 is a diagram illustrating a corresponding example between items required for user authentication and setting of jobs and waveforms corresponding to the items.

The corresponding table shown in FIG. 6 includes an item 601 indicating the job such as a copy job, a scan job and a FAX sending job, and each job is respectively associated with a specific waveform.

The corresponding table includes an item 602 indicating the parameters such as the number of copies, the magnification, the aggregate number of sheets and the like, and each parameter is respectively associated with a specific waveform as well. Further, the parameters shown in FIG. 6 are an example of parameters which are settable in the copy job.

The corresponding table includes an item 603 indicating alphanumeric characters, and a specific waveform is associated with each character. Further, these alphanumeric characters are used in values of user identification information, passwords and parameters to be set.

The corresponding table shown in FIG. 6 is continuously stored in the storage sections of the MFP 100 and the PC 300, and the program 115 and the program 310 are set in advance in order to be capable of mutually converting the waveforms and the items according to the corresponding table exemplified in FIG. 6. Furthermore, the corresponding table is continuously recorded in the storage section of the mobile terminal 200 as well, and the application 208 may be set in advance in order to be capable of carrying out the foregoing mutual conversion.

The processor 301 of the PC 300 carries out extraction of a waveform from the corresponding table on the basis of information relating to the user authentication and execution of a job in the input screen 500. The processor 301 creates the ultrasonic data by combining the extracted waveforms. Further, at the time of combining the waveforms, in order to identify delimiters of the waveforms, a waveform defined in advance which is not shown in FIG. 6 may be applied between the waveforms.

The processor 103 of the MFP 100 carries out analysis of the received ultrasonic wave to read out each waveform. However, the analysis of the ultrasonic wave refers to decomposing the ultrasonic wave in each waveform by a waveform indicating the delimiter of the waveform. The processor 103 retrieves a waveform coincident with the obtained waveform from the corresponding table, and extracts the information relating to the user authentication and the execution of the job from the hit waveform.

Figure 7:
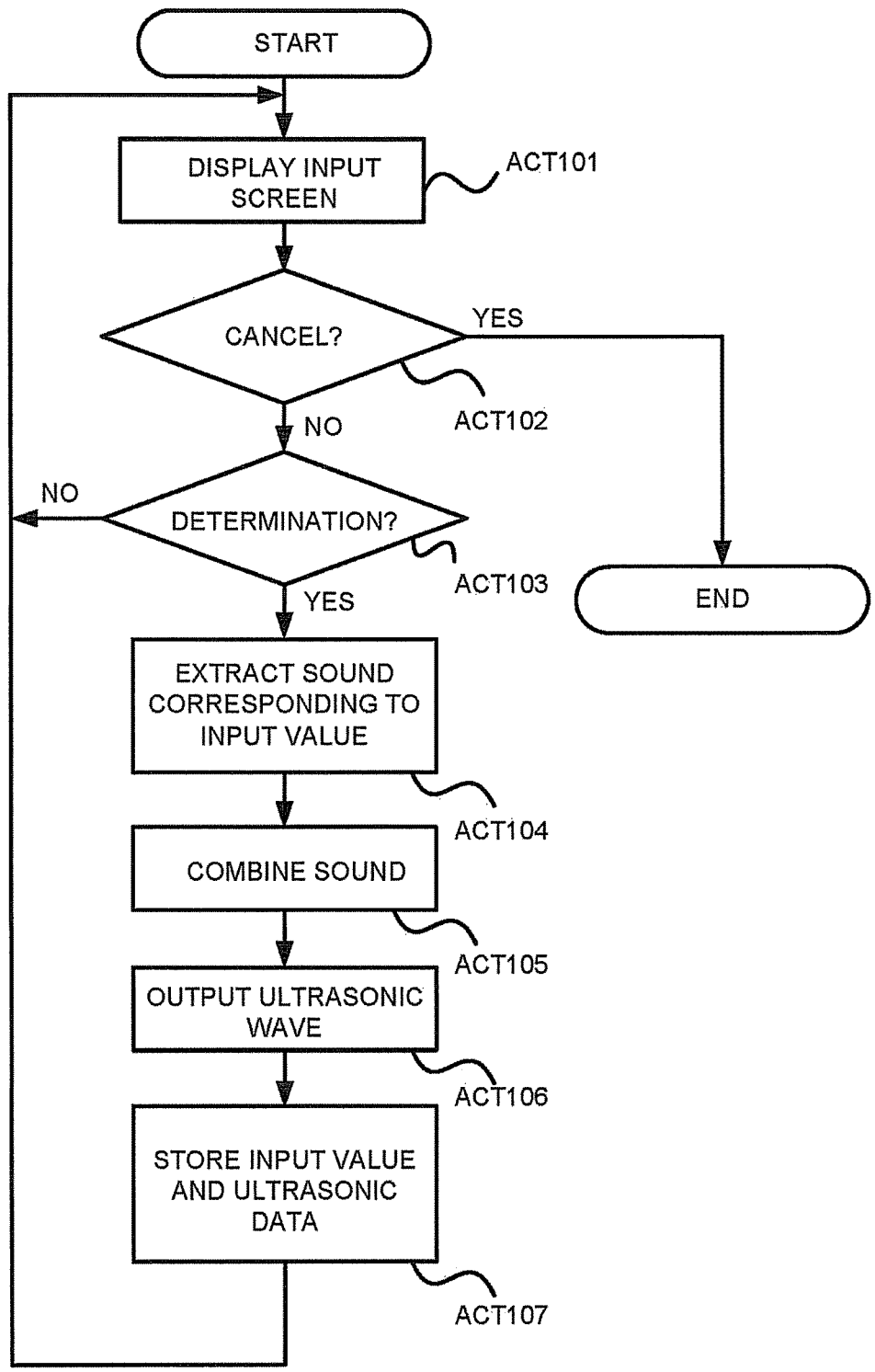
FIG. 7 is a flowchart illustrating an example of operations of the PC according to the embodiment.

FIG. 7 is a flowchart illustrating an example of operations of the PC 300. The operations shown in FIG. 7 can be realized in such a manner that the processor 301 executes the program 310.

The input screen 500 is displayed on the monitor 307 through the operation of the user (ACT 101). The input screen 500 receives the input of the information required for the user authentication and the execution of the job via the operation unit 306 while the input screen 500 is displayed. The processor 301 determines whether or not the cancel button 509 is pressed (ACT 102), and if it is determined that the cancel button 509 is pressed (Yes in ACT 102), the processing is ended.

If it is determined that the cancel button 509 is not pressed (No in ACT 102), the processor 301 determines whether or not the determination button 508 is pressed (ACT 103).

If it is determined that the determination button 508 is not pressed (No in ACT 103), the processor 301 returns to the processing in ACT 101 to maintain an input receiving state.

If it is determined that the determination button 508 is pressed (Yes in ACT 103), the processor 301 extracts a waveform corresponding to an input value according to the corresponding table exemplified in FIG. 6 (ACT 104). If the waveform of the execution job is extracted, the processor 301 retrieves the item 601 shown in FIG. 6 with a job designated by the user through the selection column 503 (refer to FIG. 5) to extract the waveform associated with the hit job name. The processor 301 retrieves the parameter from the item 602 shown in FIG. 6 with an item (item to which a value is input) designated by the user through the selection columns 504 and 505 to extract the corresponding waveform. For example, in a case in which the number of copies is "2", the processor 301 extracts the waveform corresponding to "the number of copies", and as to "2" serving as the parameter value of the set item, the processor 301 extracts the corresponding waveform selected from the item 603.

As to the user identification information and the authentication information of the password, the processor 301 retrieves the input character one by one from the item 603 to extract the corresponding waveform. After that, the processor 301 combines the obtained waveforms to create an individual waveform constituting the user identification information and the authentication information of the password.

The processor 301 combines every waveform obtained through the processing in ACT 104 (ACT 105) to create ultrasonic data. The ultrasonic data described herein refers to a data file encoded in a regulated format. The processor 301 temporarily stores the ultrasonic data in the RAM 303 in advance. Further, preamble data meaning start of the ultrasonic data may be added to the head of the waveform.

The processor 301 outputs the created data to the mobile terminal 200 in the form of the ultrasonic wave (ACT 106). The output follows a method designated through the selection column 506 in the input screen 500. In other words, in a case in which the ultrasonic communication is designated, the processor 301 regenerates the created ultrasonic data to output the regenerated data from the speaker 309 to the mobile terminal 200. On the other hand, in a case in which the e-mail is designated, the input e-mail address is regarded as the sending destination, and the created ultrasonic data is sent by mail as an addition file.

The processor 301 continuously stores the input value and the ultrasonic data in the HDD 304 in an associated manner (ACT 107). After that, the operation returns to the processing in ACT 101.

Figure 8A:
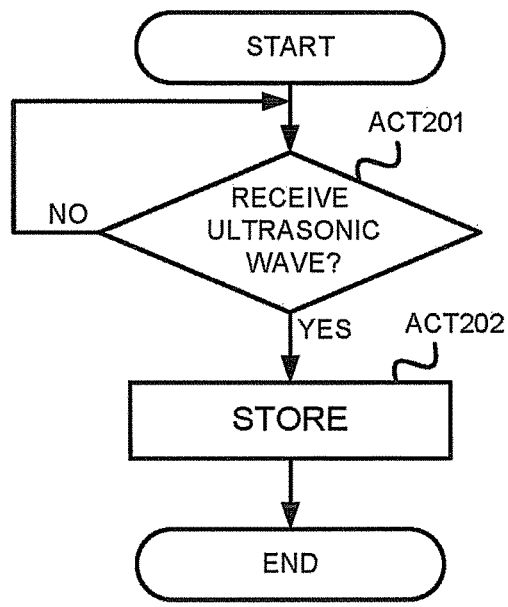
FIGS. 8A and 8B are flowcharts illustrating an example of operations of the mobile terminal according to the embodiment.

FIG. 8A is a flowchart illustrating an example of operations of the mobile terminal 200 along with reception of the ultrasonic wave. The operations shown in FIG. 8A can be realized in which a manner that the processor 201 executes the application 208.

The processor 201 carries out the reception of the ultrasonic wave (ACT 201). However, the ultrasonic wave is received via the mike 205 and recognized in the form of the ultrasonic data. Further, in ACT 201, the ultrasonic wave as the ultrasonic data may be received by e-mail via the communication device 203. In this case, in ACT 201, it is determined whether or not a mail added with the ultrasonic data is received.

The mobile terminal 200 waits for until the ultrasonic wave output from the PC 300 is received (loop of No in ACT 201).

If the ultrasonic wave is received (Yes in ACT 201), the processor 201 stores the ultrasonic data in the auxiliary storage device 207 (ACT 202) and ends the operations shown in FIG. 8A. Further, the processor 201 can store the ultrasonic data equal to or greater than 1 in the auxiliary storage device 207 according to uses. In this case, the ultrasonic data is stored together with identification information to be unique ultrasonic data or information for specifying a job name, a setting item and a set value.

Figure 8B:
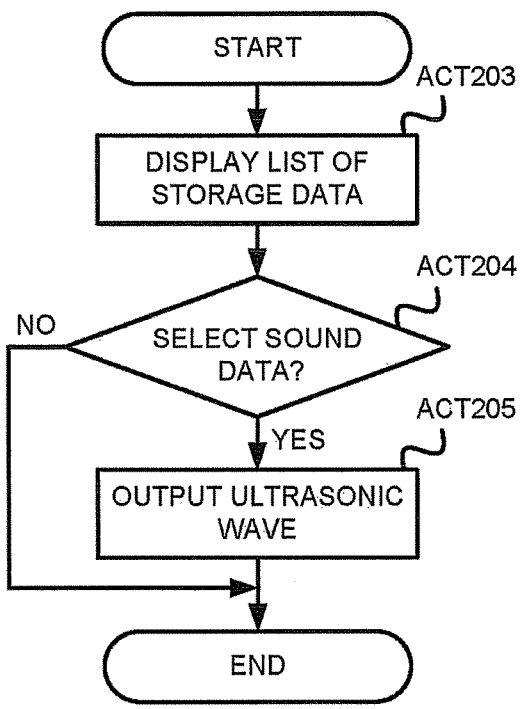

FIG. 8B is a flowchart illustrating an example of operations of the mobile terminal 200 for the purpose of the output of the ultrasonic wave. The operations shown in FIG. 8B are realized in such a manner that the processor 201 executes the application 208.

The processor 201 displays a list of the inherent information corresponding to the ultrasonic data stored in the auxiliary storage device 207 on the touch panel display 204 (ACT 203). The inherent information may be, for example, serial numbers indicating order in which data is obtained. Further, it may be applicable that the corresponding table shown in FIG. 6 is stored in the auxiliary storage device 207 in advance, and the processor 201 extracts the user identification information, the execution job and the parameter from each ultrasonic data and displays a list of information as inherent information for display.

The processor 201 confirms whether or not the ultrasonic data is selected by the user (ACT 204).

If the ultrasonic data is selected (Yes in ACT 204), the processor 201 outputs the ultrasonic data to the MFP 100 in the form of the ultrasonic wave (ACT 205) and ends the operations shown in FIG. 8B.

If the ultrasonic data is not selected (No in ACT 204), the processor 201 ends the operations shown in FIG. 8B.

FIG. 9 is a flowchart illustrating an example of operations of the MFP 100 along with reception of the ultrasonic wave. The operations shown in FIG. 9 are realized in such a manner that the processor 103 executes the program 115.

The MFP 100 waits for until the ultrasonic wave output from the mobile terminal 200 is received (loop of No in ACT 301).

If the ultrasonic wave is received (Yes in ACT 301), the processor 103 carries out an analysis processing of the ultrasonic wave (ACT 302). The analysis processing is an operation of reading out the waveform to extract information included in the first information according to the corresponding table exemplified in FIG. 6 (ACT 303).

The processor 103 carries out the user authentication with the use of the extracted authentication information (ACT 304).

If the user authentication is not established (No in ACT 304), the processor 103 ends the operations shown in FIG. 9. At this time, the processor 103 may display a message or notify sound indicating that the authentication is failed. If the user authentication is established (Yes in ACT 304), the processor 103 carries out the input of the extracted information such as the execution job and the parameter of the execution job (ACT 305), and reflects the input information and displays an inserted job setting screen on the control panel 101 (ACT 305). The set value may be changed again on the control panel 101.

The processor 103 confirms whether or not a job is started by the user with, for example, a regulated start button pressed (ACT 307).

If the job is not started by the user (No in ACT 307), the processor 103 returns to the processing in ACT 306.

If the job is started by the user (Yes in ACT 307), the processor 103 executes the job (ACT 308).

The processor 103 confirms whether or not the set value is amended (ACT 309).

If the amendment of the set value is not confirmed (No in ACT 309), the processor 103 ends the operations shown in FIG. 9.

If the amendment of the set value is confirmed (Yes in ACT 309), the processor 103 converts the amended set value to the ultrasonic data and output the amended set value to the mobile terminal 200 (ACT 310), and ends the operations shown in FIG. 9. Further, the mobile terminal 200 can reflect amended matters by receiving and storing the output ultrasonic data according to the flowchart shown in FIG. 8A. Further, a conversion from the amended set value to the ultrasonic wave is the same as the foregoing operation of the PC 300, and thus the description thereof is omitted.

Further, if the job is ended, in addition to the foregoing operation, the processor 103 of the MFP 100 outputs specific ultrasonic wave for notifying the mobile terminal 200 of the end of the job. The processor 201 of the mobile terminal 200 receives the specific ultrasonic wave from the MFP 100 to confirm the end of the job.

In a case in which analysis failure is generated in the processing in ACT 302, for example, data which is not assumed is obtained, the processor 103 may notify the mobile terminal 200 with the use of the ultrasonic communication. Otherwise, this message may be output from the speaker 114 through a sound message at a frequency which can be recognized by people.

In the foregoing embodiment, the PC 300 displays the input screen 500 shown in FIG. 5 and generates or creates the ultrasonic data according to the flowchart shown in FIG. 7; however, the operations may be carried out by the mobile terminal 200. In other words, the processor 201 of the mobile terminal 200 may control the touch panel display 204 to display the input screen 500 and execute the operation shown in FIG. 7.

In the present embodiment, a case in which a function of executing the invention inside an apparatus is recorded in advance is described; however, the present invention is not limited to this. The same function may be downloaded to the apparatus from a network, or a device which stores the same function in a recording medium may be installed in the apparatus. The form of the recording medium may be any form as long as the recording medium can store a program like a CD-ROM and can be read by the apparatus. Further, the function obtained by being installed or downloaded in advance in this way may be realized through cooperation with an OS (Operating System) inside the apparatus.

According to the embodiment, the user can directly execute an intended operation in a short time instead of carrying out the user authentication and the setting of the execution job with the image forming apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An authentication system, comprising:
a mobile terminal configured to output an ultrasonic wave comprising authentication information; and
an image forming apparatus configured to receive the ultrasonic wave output by the mobile terminal, carry out authentication on the basis of the authentication information extracted from the ultrasonic wave and allow execution of a job at a time the authentication is established,
wherein different ultrasonic wave forms are allocated to each execution job, each parameter value and each alphanumeric character,
the ultrasonic wave output by the mobile terminal has a single ultrasonic wave form that is generated by combining a plurality of ultrasonic wave forms corresponding to the execution job, the parameter value and the alphanumeric character that are input,
the image forming apparatus further extracts job information comprising identification information of the execution job and the parameter value of the execution job from the ultrasonic wave, sets the execution job and the parameter value of the job according to the job information at the time the authentication is established and displays the execution job and the parameter value of the job.

2. The authentication system according to claim 1, further comprising:
a computer configured to generate and output the ultrasonic wave, wherein
the mobile terminal further receives the ultrasonic wave output from the computer.

3. The authentication system according to claim 2, wherein
the computer converts the ultrasonic wave to a file which can be regenerated with the mobile terminal and outputs the converted file to the mobile terminal.

4. The authentication system according to claim 2, wherein
the computer further inserts the job information executed by the image forming apparatus into the ultrasonic wave.

5. The authentication system according to claim 1, wherein
the image forming apparatus further carries out amendment of the job information and generates and outputs an ultrasonic wave comprising the amended job information; and
the mobile terminal further receives and digitalizes the ultrasonic wave output from the image forming apparatus to store the digitalized ultrasonic wave.

6. The authentication system according to claim 1, wherein
the mobile terminal further generates the ultrasonic wave.

7. The authentication system according to claim 1, wherein
the mobile terminal further stores ultrasonic data obtained by digitalizing the ultrasonic wave equal to or greater than 1, displays information inherent to each ultrasonic data on a screen and outputs sound of the ultrasonic data corresponding to selected inherent information.

8. The authentication system according to claim 1, wherein the parameter value comprises at least one of a number of copies, a magnification, and an aggregate number of sheets.

9. A mobile terminal, comprising:
a speaker;
a storage configured to store ultrasonic data equal to or greater than 1 serving as electronic data obtained by encoding an ultrasonic wave and serving as electronic data of ultrasonic wave comprising authentication information for authenticating whether or not use of an image forming apparatus a is allowed;
a display configured to display inherent information for specifying each ultrasonic data on a screen; and
a processor configured to control to regenerate the ultrasonic data corresponding to selected inherent information to output the regenerated ultrasonic data by a speaker,
wherein the storage further contains the electronic data of the ultrasonic wave comprising job information comprising identification information of a job executed by the image forming apparatus and a parameter value of the execution job in the ultrasonic data to store the ultrasonic data,
different ultrasonic wave forms are allocated to each execution job, each parameter value and each alphanumeric character,
the ultrasonic wave output by the mobile terminal has a single ultrasonic wave form that is generated by combining a plurality of ultrasonic wave forms corresponding to the execution job, the parameter value and the alphanumeric character that are input.

10. The mobile terminal according to claim 9, wherein the parameter value comprises at least one of a number of copies, a magnification, and an aggregate number of sheets.

11. An authentication method, comprising
outputting an ultrasonic wave comprising authentication information;
receiving the outputted ultrasonic wave, carrying out authentication on the basis of the authentication information extracted from the ultrasonic wave and allowing execution of a job at a time the authentication is established, extracting job information comprising identification information of an execution job and a parameter value of the execution job from the ultrasonic wave, setting the execution job and the parameter value of the job according to the job information at the time the authentication is established, and displaying the execution job and the parameter value of the job, wherein different ultrasonic wave forms are allocated to each execution job, each parameter value and each alphanumeric character, the ultrasonic wave has a single ultrasonic wave form that is generated by combining a plurality of ultrasonic wave forms corresponding to the execution job, the parameter value and the alphanumeric character that are set.

12. The authentication method according to claim 11, further comprising:

amending the job information and generating and outputting an ultrasonic wave comprising the amended job information; and receiving and digitalizing the ultrasonic wave comprising the amended job information to store the digitalized ultrasonic wave.

13. The authentication method according to claim 11, further comprising:

storing ultrasonic data obtained by digitalizing the ultrasonic wave equal to or greater than 1, displaying information inherent to each ultrasonic data on a screen, and outputting sound of the ultrasonic data corresponding to selected inherent information.

\* \* \* \* \*